United States Patent [19]
Okada et al.

[11] Patent Number: 5,407,061
[45] Date of Patent: Apr. 18, 1995

[54] SLAT CONVEYOR

[75] Inventors: Nobuyuki Okada; Takuya Eikyu; Nobuya Hishinuma, all of Tokyo, Japan

[73] Assignee: Toyokanetsu Kabushiki Kaisha, Tokyo, Japan

[21] Appl. No.: 260,225

[22] Filed: Jun. 14, 1994

[30] Foreign Application Priority Data

Jun. 15, 1993 [JP] Japan .............................. 5-032099 U

[51] Int. Cl.⁶ .................................................. B65G 15/60
[52] U.S. Cl. ...................................... 198/812; 198/852
[58] Field of Search ........................... 198/851–853, 198/812

[56] References Cited

U.S. PATENT DOCUMENTS

| | | | |
|---|---|---|---|
| 2,142,003 | 12/1938 | Morgelin | 198/851 X |
| 3,174,617 | 3/1965 | Noffsinger | 198/851 |
| 3,742,863 | 7/1973 | Rosenberger, Jr. | 198/851 X |
| 3,944,059 | 3/1976 | Garvey | 198/851 X |
| 3,952,860 | 4/1976 | Specht | 198/852 X |
| 5,076,422 | 12/1991 | Clopton | 198/852 X |
| 5,161,674 | 11/1992 | Rutz et al. | 198/812 |

*Primary Examiner*—D. Glenn Dayoan
*Attorney, Agent, or Firm*—Sughrue, Mion, Zinn, Macpeak & Seas

[57] ABSTRACT

The invention concerns a slat conveyor in which the extension of the pitch due to the wear of a chain can be easily adjusted without performing the construction work required for conventional conveyors. In the conveyor, slat supporting members support slats adjacent to one another in a travelling direction. Each of the slat supporting members is provided with a first connection portion and a second connection portion for connecting the adjacent slat supporting members and the second connection portion of a succeeding slat supporting member overlaps the first connection portion of a preceding slat supporting member. Coupling shafts are provided, each with a first shaft portion engaged with the first connection portion and a second shaft portion engaged with the second connection portion; the first shaft portion and the second shaft portion are made eccentric from each other on two axes in parallel, and the coupling shaft serves to adjust the interval between the adjacent slats by rotation of its attaching position freely and joins the slat supporting members endlessly into a chain.

5 Claims, 6 Drawing Sheets

PRIOR ART

FIG. 5

PRIOR ART

SLAT CONVEYOR

BACKGROUND OF THE INVENTION

1) Field of the Invention

The present invention relates to a slat conveyor, and more particularly to a slat conveyor used to deliver or classify articles or baggage in an airport, delivery center, etc.

2) Description of Related Art

Traditionally, a slat conveyor, which can be used regardless of the type of articles to be conveyed, has been used in several fields. The slat conveyor has several kinds of formats.

Figure 5:
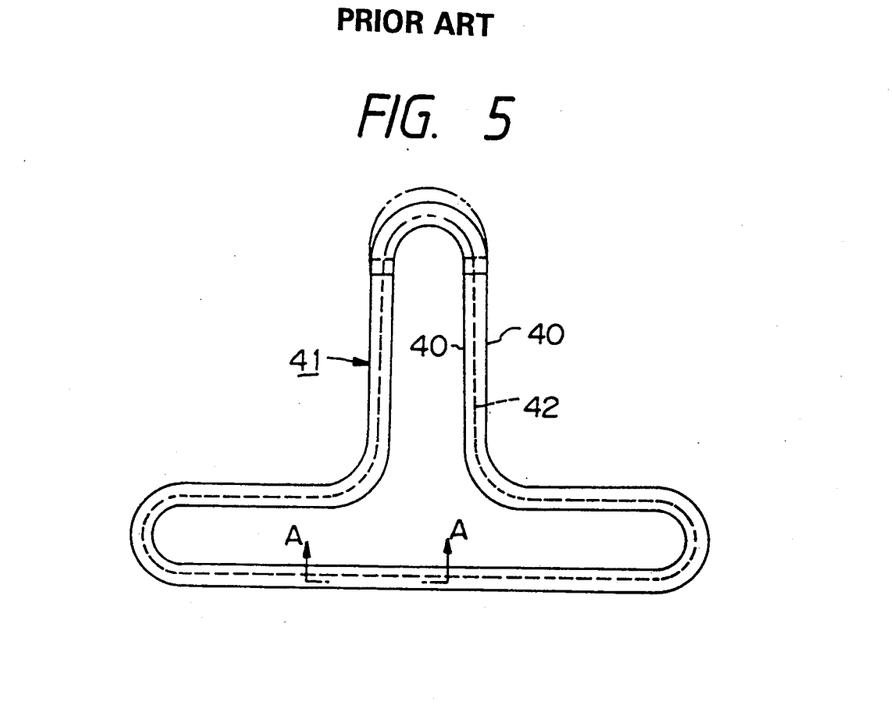
FIG. 5 is a plan view of the conventional slat conveyor accompanied with changes in flames.
Figure 6:
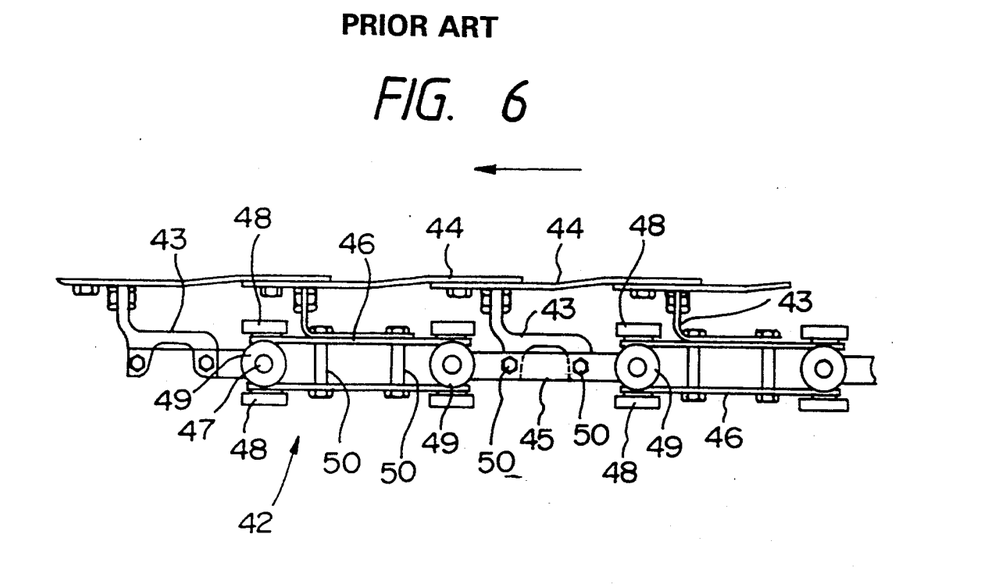
FIG. 6 is a side view showing the structure of slat supporting members used in the conventional slat conveyor.

An example of the slat conveyor will be explained below. In many cases, as shown in FIG. 5, in order to convey an article to a predetermined position, frames 40 are fixed on a floor by an anchor bolt to form a conveying path 41 having a path bent as necessity requires. An endless chain 42 is mounted on the center line of the conveying path 41. On the chain 42, a large number of slat supporting members 43 as shown in FIG. 6 (A—A section in FIG. 5) are attached, and on the slat supporting members 43, square slats 44 made of synthetic rubber are attached.

The above chain 42 is formed endlessly and rotatably in such a manner that a set of chain links 45 arranged on right and left sides (face and back of the drawing) and a set of chain links 46 arranged on the upper and lower sides are alternately combined. Cross-shape shafts 47 are arranged at points where the chain links 45 and the chain links 46 are connected. A roller 48 is rotatably provided on the axis of each of the shafts 47 extended vertically, and is adapted to roll along a guide (not shown) provided at the position where the chain 42 is mounted on the center portion of the frames 40.

A roller 49 is also rotatably provided on the axis of each of the shafts 47 (face and back sides of the drawing), and is adapted to rotate along the guide (not shown) provided on the frames 40. The chain 42 is moved along the conveying path 41 by a driving device (not shown). The slat supporting member 43 is attached to each chain link through a bolt member 50. The slats 44 attached on the slat supporting members 43 are configured so that on the lower side of tail end of a certain slat, the upper surface of the front end of a succeeding slat is superposed in a direction of the travelling direction of the slat supporting members 43 so that the article placed on the slat 44 can be smoothly conveyed without dropping the article from the conveying path 41.

However, the conventional slat conveyor having the above arrangement has the following problem. The use for a long time gives rise to extension or stretch of the chain owing to the wear of the shafts connecting the chain links. This leads to the inconvenience such as backlash in the chain links so that smoothness in the travel at the curve of the conveying portion is lost to generate vibration and noise.

For this reason, in order to obviate the above inconvenience, in the prior art, the travelling system inclusive of the frames, travelling rails, etc. must be shifted in accordance with extension of the chain. For example, as indicated by double-dotted chain lines in FIG. 5, the travelling system was adjusted at the portions of connecting the curve portion and straight portion of the frames of the conveyor. Specifically, the curve portions were shifted and the gaps thus generated were filled with some new member. However, since the frames are usually fixed to a floor by anchor bolts, such an adjusting method has a problem that much labor and time as well as large-scale construction are required. Further, in order to exchange worn shafts, all of many shafts must be checked and the chain must be dismantled and reassembled, thus requiring much labor and time.

SUMMARY OF THE INVENTION

Under the above circumstances, the present invention has been completed, and an object of the present invention is to provide a slat conveyor which can easily adjust the chain's tension without shifting frames and greatly changing the intervals between slat supporting members.

The above object of the present invention can be achieved by a slat conveyor comprising: slats which constitute an article conveying surface so as to be adjacent to one another in a travelling direction in frames along a conveying path; slat supporting members each provided with a first open connection portion and a second open connection portion at its front and rear in the travelling direction and connected in a chain to support each slat by its upper end; and coupling shafts each provided with a first shaft portion engaged with said first connection portion and a second shaft portion engaged with said second connection portion, the central axes of the shaft portions being made eccentric to each other. The first connection portion and the second connection portion of the slat supporting members adjacent to each other are joined in a state where they are superposed vertically. The shaft portions are rotatable within both said connection portions.

The slat conveyor may further be provided with a disk member provided on the upper end surface of said first shaft portion, said disk member having a diameter larger than that of said first connection portion, and a fixing member for freely fixing the relative positions of the disk member and said first connection portion in a rotary direction.

In the slat conveyor according to the present invention having the above construction, with the first shaft portion of the coupling shaft set at the position of the side opposite to the travelling direction of the slat conveyor (the rear side in the travelling direction), if the respective slat supporting members are compiled to form a chain, the pitch when the slat supporting members are mounted can be lengthened by an eccentric portion between the first shaft portion and the second shaft portion.

The slat conveyor is operated in a state where the pitch has been lengthened by the eccentric portion of the coupling shaft. Thereafter, when the pitch (chain pitch) between the respective slat supporting members is extended owing to abrasion of the coupling shaft due to the use for a long time, the disk portion on the first shaft portion and the fixing member which fixes the first connection portion of the slat supporting member are removed and the second shaft portion of the coupling shaft is revolved to adjust the eccentric position from the first shaft portion so that the pitch between the slat supporting members is reduced, thus permitting the length of the coupling shaft to be adjusted.

DETAILED DESCRIPTION OF THE PREFERRED EMBODIMENTS

With reference to FIGS. 1 to 4, a detailed explanation will be given of one embodiment of the present invention.

Figure 1:
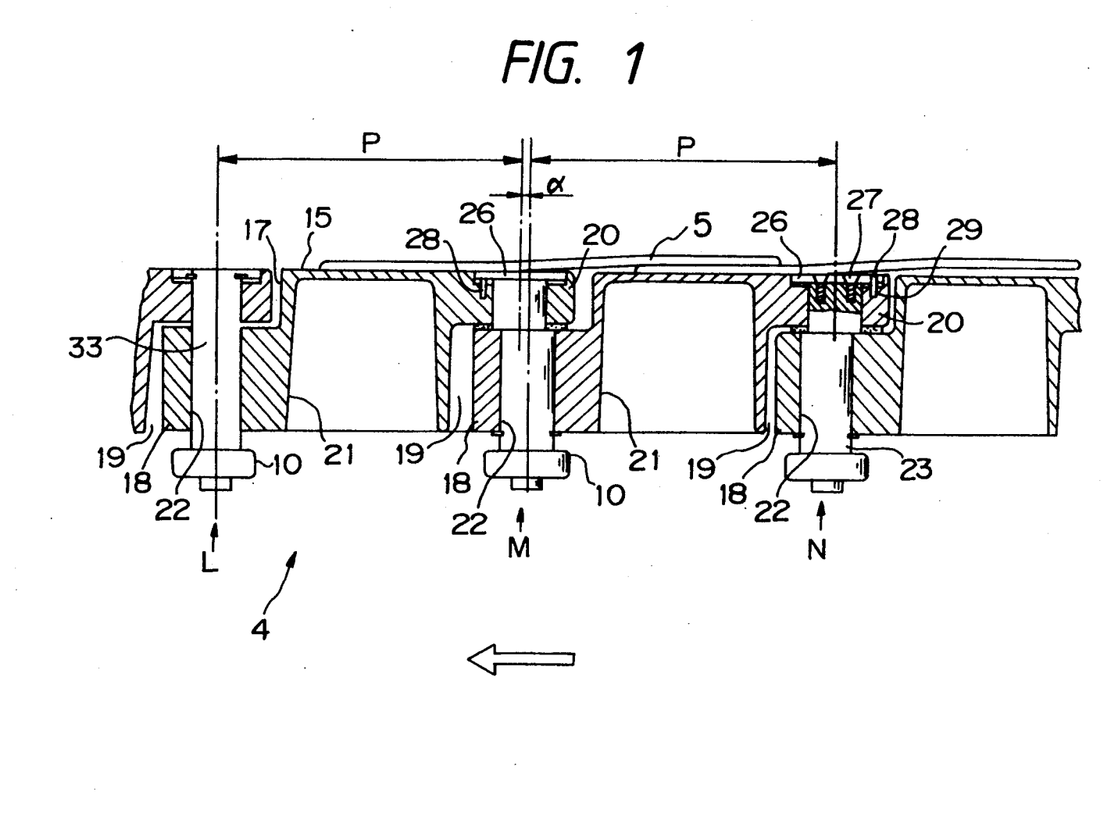
FIG. 1 is a sectional view of the main part of one embodiment of the slat conveyor according to the present invention in a direction of travelling.
Figure 2:
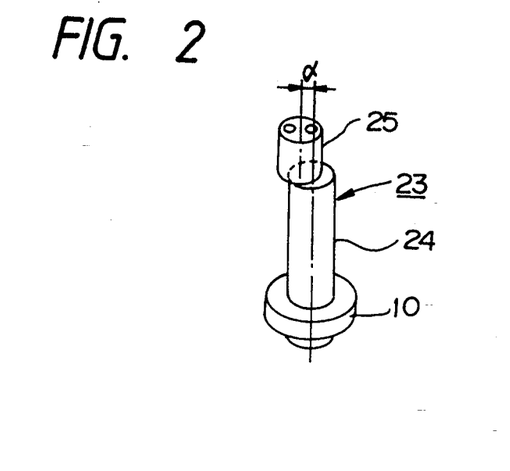
FIG. 2 is a perspective view of the coupling shaft shown in FIG. 1.
Figure 3:
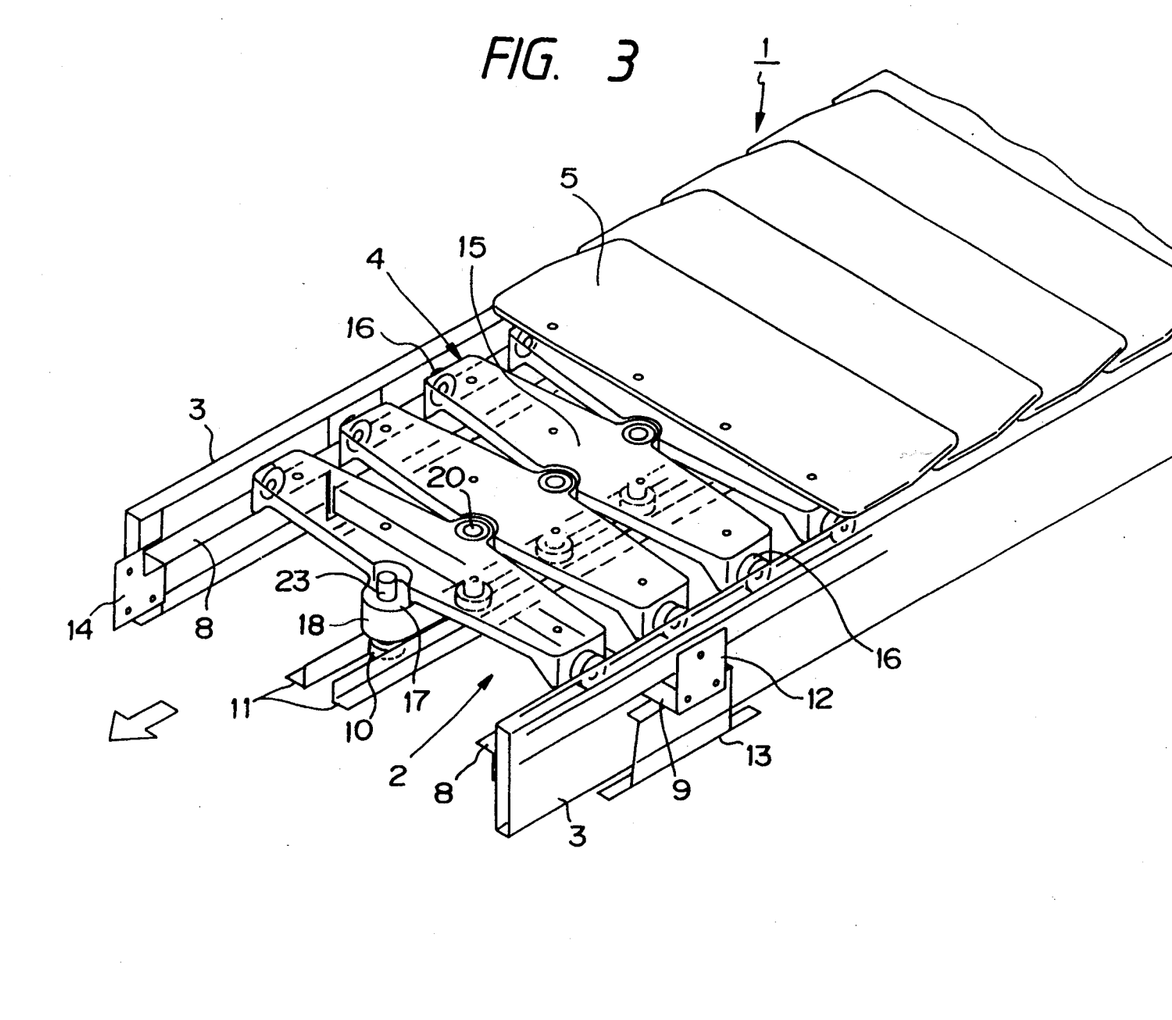
FIG. 3 is a perspective view of the main part of the slat conveyor according to the present invention.

FIG. 1 is a sectional view showing, in the conveying direction of a slat conveyor, the state where slat supporting members and coupling shafts are coupled together to constitute a slat conveyor; FIG. 2 is a perspective view of the coupling shaft; FIG. 3 is a perspective view of the main part of the slat conveyor; and FIG. 4 is a plan view of the conveying path of the slat conveyor.

Figure 4:
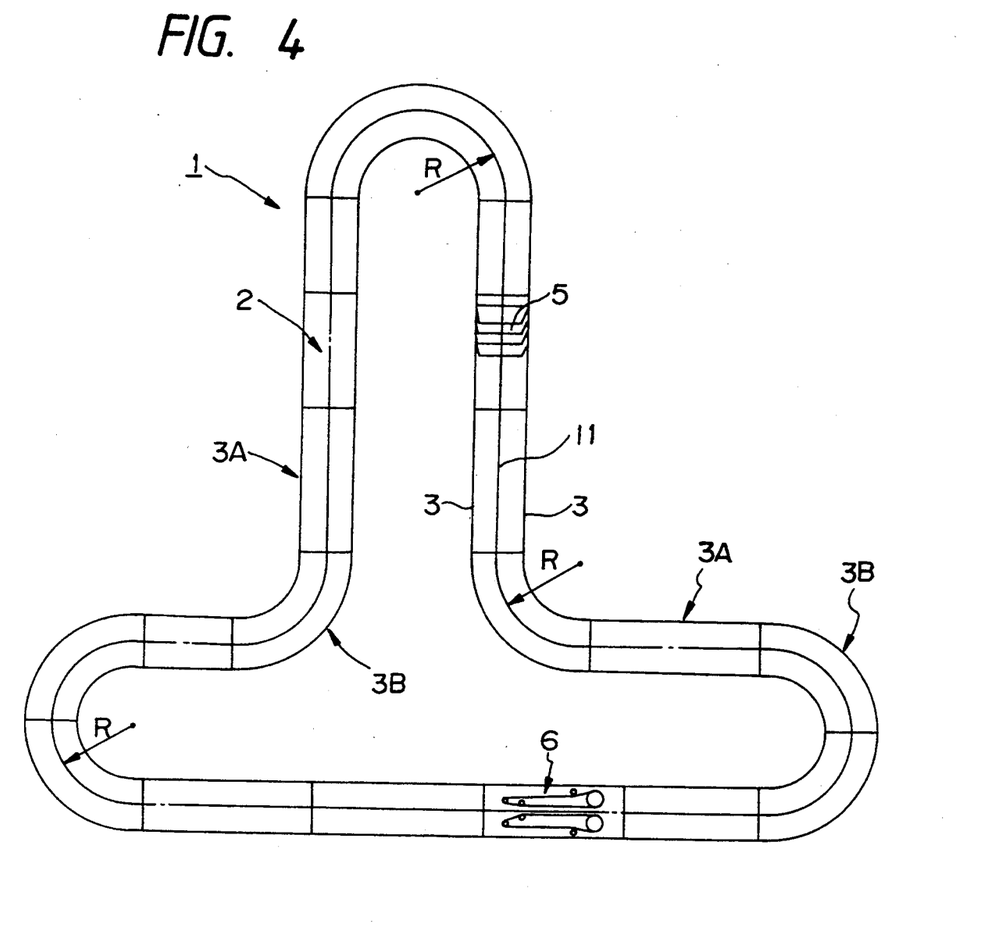
FIG. 4 is a plan view of the conveying path of the slat conveyor according to the present invention.

As seen from FIG. 4, the conveying path 2 of a slat conveyor 1 according to the embodiment of the present invention is laid in a T-shape in its entire plan shape. The slat conveyor 1, the detail of which is shown in FIG. 3, includes, in its entire structure, a pair of right and left frames 3, slat supporting members 4 which are provided on the frames 3 and can freely travel, slats 5 which are provided on the respective slat supporting members 4 and on which articles are placed, center guides 11, and a driving device 6 which can be engaged with the slat supporting members 4, as necessity requires, to move the supporting members on the conveying path 2.

Incidentally, each of curves R on the conveying path 2 is formed to have the same radius which permits the slat supporting members 4 to be moved. Its shape should not be limited to that as shown but can take many forms. Further, in FIG. 4, the line representing the center guide 11 drawn in the center of the conveying path 2 represents a substantial travelling center on which the slat supporting members 4 travel in a state where they are endlessly linked or coupled into a chain.

The frames 3, as shown in FIG. 3, are side plates vertically provided on the right and left sides of the conveying path 2. On the inside of each side plate, a guide rail 8 for guiding the travel of the slat supporting members 4 is provided. On the lower side of the guide rail 8, a cross member 9 is attached to maintain the predetermined width between the frames 3 which are the left and right side plates. In the center of the cross member 9 in its width direction, the center guides 11 are provided so that the guide wheel 10 provided on the lower side of each of the slat supporting members 4 is sandwiched therebetween. The cross member 9 has a portion 12 protruded outwardly from the frames 3. The protruding portion 12 is attached to the leg member 13 fixed on a floor.

Incidentally, the frames 3 described above are composed of a plurality of straight frames 3A and curved frames 3B as shown in FIG. 4. Using plate connection members 14 attached on the frames 3, several kinds of conveying paths 2 can be formed.

Each of the slat supporting members 4 which are located so as to be freely movable in the conveying path 2, as shown in FIG. 3, has a main part 15 having a flat shape when viewed from above. On both sides of the main part 15 in its longitudinal direction, travelling wheels 16 which roll on the said guide rails 8 are provided rotatably. At both the apex portions in the center portion of the main part 15 in the lateral direction (travelling direction), a second connection portion 18 and a first connection portion 20 are provided. Specifically, on one side, the second connection portion 18 is provided below a step portion 17 while on the other side the first connection portion 20 having a recess 19 for receiving the second connection portion 18 is provided below the extended portion of the top surface of the main part 15 (FIG. 1).

In the centers of the first connection portion 20 and the second connection portion 18, shaft openings 22 which have equal (may not be equal) diameters are provided. A coupling shaft 23 as shown in FIG. 2 is attached in each of the shaft openings 22.

The coupling shaft 23 is made up of a second shaft portion 24 which is engaged with the second connection portion 18 and a first shaft portion 25 which is eccentric from the second shaft portion 24 by α. On the lower side of the second shaft portion is the guide wheel 10 which is sandwiched between the center guides 11 and freely rotatable.

On the upper end surface of the first shaft portion 25 of the coupling shaft 23, a disk member 26 having a diameter larger than that of the first shaft portion 25 is attached on the center of the first shaft portion 25 through a screw 27. The disk member 26 serves to prevent the first connection portion 20 from deviating from the first shaft portion 25 during travelling. A fixing member 28 is also provided to adjust the positions where the disk member 26 and the first connection portion 20 are attached. The fixing member 28 is a pin-like member implanted on the disk member 26, and the pin-like member intrudes into a fixing opening 29 provided in the first connection portion 20 around the shaft opening 22. Specifically, the fixing openings 29 are provided at e.g. two positions of 180° around the shaft opening 22. The fixing member 28 is selectively engaged with either opening so that the interval (pitch) between the slat supporting members 4 can be adjusted.

The above two fixing openings 29 are provided one for each of front and rear sides in position along the radial direction of the shaft opening 22 in the travelling direction of the slat supporting member 4. If the fixing member 28 is fixed on the front side in the travelling direction, as indicated by M in FIG. 1, the distance from the center of the second shaft portion 24 of a certain slat supporting member to that of a preceding slat supporting member is lengthened by α.

If the fixing member 28 is fixed on the rear side in the travelling direction, as indicated by N in FIG. 1, the above distance is shortened by α. Incidentally, at the L portion in FIG. 1, where the conventional step-free direct pin-type coupling shaft 33 is fixed in the fixing opening, no change in the pitch P is generated.

As described above, the fixing position of the fixing member 28 to the first shaft portion 25 and the first connection portion 20 is varied with respect to the second shaft portion 24 of the coupling shaft 23 so that the pitch of the slat supporting members 4 can be set as $P+\alpha$ or $P-\alpha$. Thus, although the number n of the coupling shafts 23 to be attached depends on the shape of a conveyor or other factors, when $n = P/2\alpha$ is set for one line of the conveyor, the line can be adjusted to have any length by adjustment of the pitch of the slat supporting members 4 based on the revolution of the coupling shafts and addition or removal of the slat supporting members 4.

As shown in FIG. 1 or 3, slats 5 molded using synthetic rubber are screwed to the slat supporting members 4 constructed as described above along the longitudinal direction of the main part 15 in such a manner that a succeeding slat partially underlies a preceding slat. For this reason, the articles placed on the slats can be carried very smoothly. During conveying, even when the coupling shafts 23 or shaft openings 22 wear out to extend to the above pitch, it can be easily corrected by adjustment of the fixing members 28 of the coupling shafts 23.

In the above embodiment, although the coupling shaft 23 was reattached by rotation of 180°, in the present invention, the fixing position of the coupling shaft 23 may be set by the angle smaller than 180° in a range where horizontal changes in the position of the main part 15 of each slat supporting member is permissible in the structure of the conveyor. Then, the length of the conveyor can be adjusted more minutely.

As described above in detail, the slat conveyor according to the present invention, in which the slat supporting members and coupling shafts constituting a chain have a length adjusting mechanism, can be placed without adjusting the frames in any conveyor layout. Further, even when the chain stretches owing to use for a long time, its length can be adjusted by changing the eccentric positions of the coupling shafts without performing the large-scale work such as reconstruction of the frames. This permits maintenance cost to be reduced. Thus, shifting the flames partially, which has been conventionally carried out, is not required, and vast labor for shaft exchange is not also required.

Figure 7:
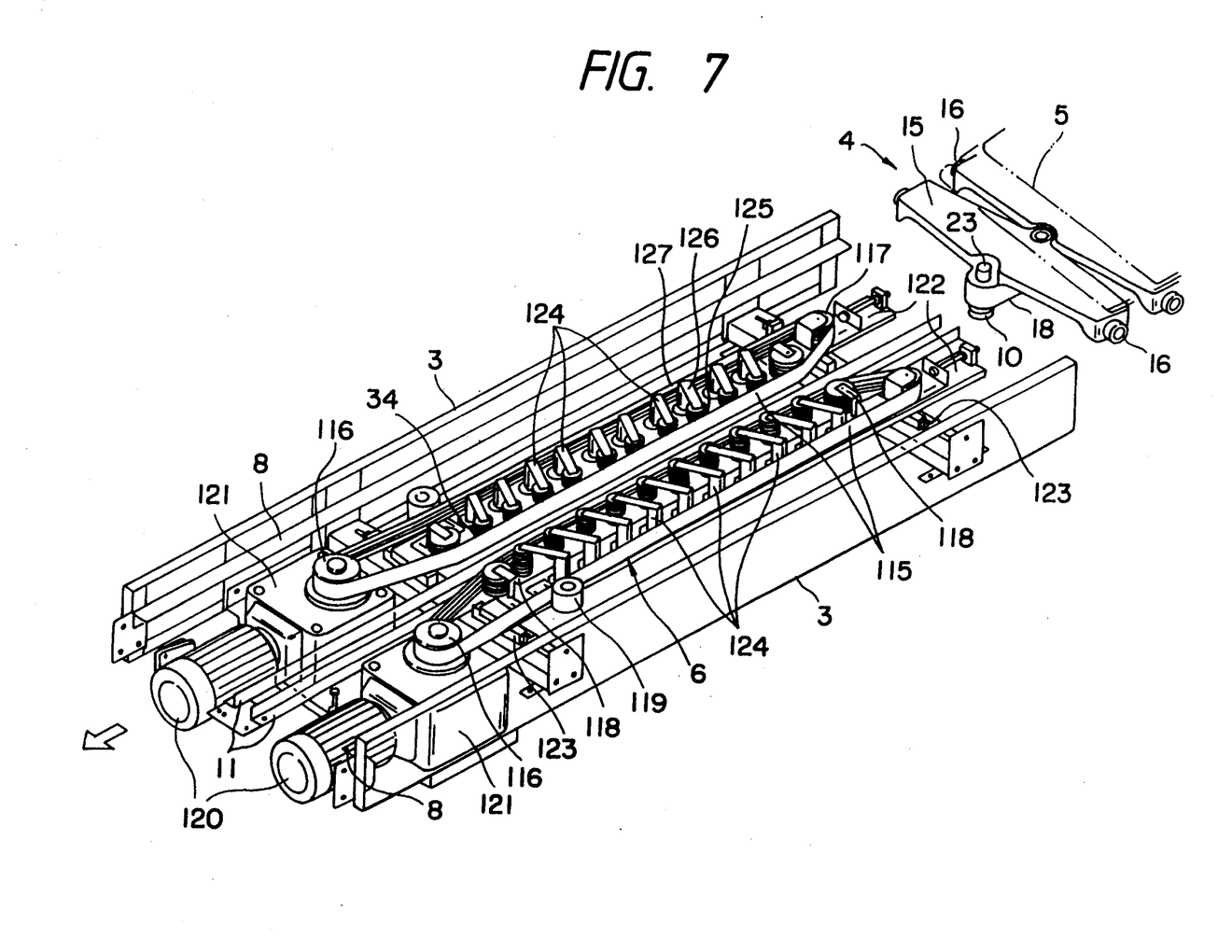
FIG. 7 is a main-part perspective view of the slat conveyor and the driving device employed therein according to one embodiment of the present invention.

Next, with reference to FIGS. 7, 8 and 9, an explanation will be given of the driving device 6 for moving the slat supporting members 4. The driving device 6 includes a pair of driving belts 115 each having a predetermined length along the center guides 11 at positions slightly above the center guides 11; a pair of driving pulleys 116 and sub-pulleys 117 for stretching the driving belts 115; at least two guide rollers 118 on each side for guiding the driving belts 115; a pair of holding rollers 119 for stopping bounding of the driving belts 115 during travelling; pairs of tension rollers 125; and a pair of motors 120 which are means for driving the driving belts 115. Each motor 120 is provided with a transmission device 121 for changing the rotary speed of the driving pulley 116. On the side of each sub-pulley 117, a tension adjusting device 122 for changing the tension to be applied to the driving belt 115 is provided. Each guide roller 118 is provided with an interval adjusting device 123 for adjusting the interval between the driving belts 115; the interval is adjusted so that the driving belts 115 are in intimate contact with both parallel sides of the second connection portion 18 of the slat supporting member 4.

On both sides of the driving device 6, a plurality of tension rollers 125 are mounted between the two guide rollers 118. On each side, the tension rollers 125 inwardly presses the driving belt 115 stretched between the guide rollers 118. Specifically, as shown in FIG. 8, each of the tension rollers 125 is supported by an elastic supporting member 124 so that it presses the driving belt 115 from the inside. The elastic supporting member 124 has a rotatable arm portion 126 at the tip of which the tension roller 125 is rotatably provided. The arm portion 126 includes, at its one end, a fulcrum shaft 127 rotatably supporting the arm portion 126, a coil spring 128 forcing the fulcrum shaft 127 toward a predetermined direction and a supporting tube 129 which encases the fulcrum shaft 127 and the coil spring 128.

Figure 8:
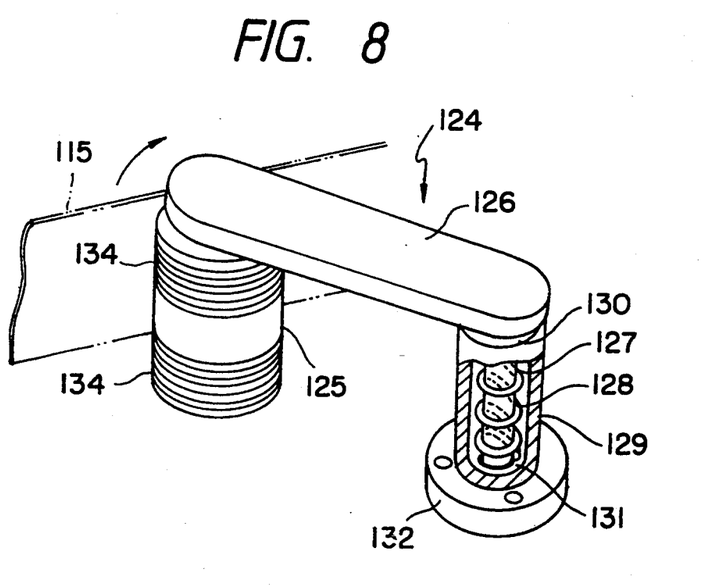
FIG. 8 is a partially-broken perspective view of the tension roller shown in FIG. 1.

The supporting tube 129 is a hollow cylinder as shown in FIG. 8 which is provided with, at its upper end, a cover 130 having a bush function causing the fulcrum shaft 127 to be penetrated, and at its lower end, a pedestal hole 131 which supports the fulcrum shaft 127. The fulcrum shaft 127 is supported in a vertical direction by the cover 130 and pedestal hole 131. The supporting tube 129 is provided, at its lower end, with a flange 132 which is mounted in the conveyor frame 3 through the adjusting device 123, etc.

One end of the coil spring 128 provided around the fulcrum shaft 127 is fixed to the shaft 127 and the other end thereof is fixed to the supporting tube 129. The fulcrum shaft 127 is set in the supporting tube 129 to force the coil spring 128 in a winding direction so that the arm portion 126 integrally fixed to the fulcrum shaft 127 is held to rotate in a predetermined direction.

Figure 9:
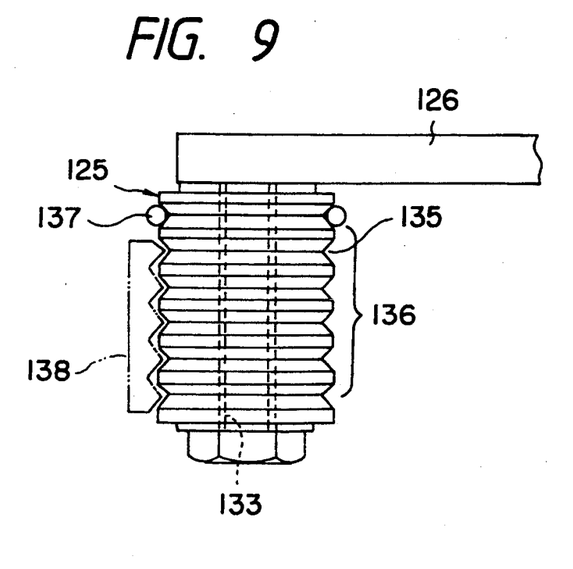
FIG. 9 is a side view of the tension roller according to another embodiment of the present invention.

At the other end of the arm portion 126, a center shaft 133 is vertically provided (see FIG. 9). The tension roller 125 is rotatably provided around the center shaft 133. The tension roller 125 is a roller made of hard resin or metal and has ring grooves on its upper and lower portions. The ring grooves are filled with rubber rings 134 made of e.g. silicon rubber in several lines in parallel. The rubber rings 134 are pressed on the back face of the driving belt 115. When the coil spring 128 is forced, as shown in FIG. 7, the tension roller 125 presses the driving belt 115 to the side of second connection portion 18 from both sides. The tension roller 125 can be smoothly brought into contact with the driving belt 115 through the rubber rings 134. Even when a trouble of cutting of one driving belt 115 occurs, the roller 125 is kept in contact with the second connection portion 18. Then, because of provision of the rubber ring 134, noise due to contact with the second connection portion 18 does not occur.

In the driving device 6 thus constructed for the slat conveyor, when the driving pulleys 116 are driven by the motors 120 through the transmission devices 121, the driving belts 115 are operated in synchronism at a predetermined speed. Thus, both driving belts 115 drive the slat supporting member 4 in a state where both sides of the second connection portion 18 is sandwiched. In this case, since the tension roller 125 is rotatable through the arm portion 126 and kept in a pressed state by a predetermined force, even when both sides of the second connection portion 18 have some uneven shape, tension roller 125 moves following this uneven shape. Thus, since the driving force of the belt is continuously transferred to the slat supporting members 4, smooth driving of the slat supporting members 4 can be ensured.

FIG. 9 shows another embodiment of the tension roller 125. The tension roller 125 is formed of an elastic cylinder or column having a height equal to the width of the driving belt 115. Its entire outer surface has an uneven portion 136 including grooves 135 made at a constant pitch.

Such a tension roller 125 is kept in soft touch with the driving belt 115 and also provides no slip between it and the driving belt 115. Further, when the rings 137 are fit in the grooves 135 and a driving belt 138 having grooves on the face abutting on the tension roller 125 is used, the vertical (i.e. width direction of the belt) vibration of the driving belt 138 can be effectively restrained.

The shapes of the driving belt, tension roller, etc. should not be limited to those in this embodiment. For example, a combination of a timing belt and a toothed pulley can also be used.

In the above embodiment, two driving motors are provided. However, such two driving motors are not necessarily required, but a structure may be adopted in which both driving belts are driven by a single motor and belt-pulley in interlock with it.

In the above embodiment, the driving device was applied to the slat conveyor moving on a conveying path, but the driving device can also be applied to a conveying system in which trucks or trays on which articles are placed are coupled by a travelling chain.

As described above, the driving device used in this embodiment for moving slat supporting members in a conveying path which are successively connected to hold slats constituting an article conveying surface, includes endless driving belts which are kept in contact with both sides of the second connection portions of the slat supporting members and driven by driving means arranged oppositely to each other so as to move the slat supporting members in a predetermined direction and tension rollers which are supported by the elastic supporting member inside both driving belts to bring the driving belts into pressure-contact with the sides of the second connection portions. In this way, since the driving belt is brought into contact with the second connection portion and the plural tension rollers for elastically pressing the belt are provided on the back side of the belt, the slat supporting members can be moved smoothly. Further, since the slat conveyor uses friction-contact through the belt and elastic member, noise due to metal contact does not occur.

Even when the driving belt on one side is cut or broken while the slat supporting members move, in place of the driving belt, the tension rollers continue to press and support the one side of the second connection portions. For this reason, without stopping a conveying operation immediately, the conveying operation can be smoothly continued by the driving belt on the other side.

What is claimed is:

1. A slat conveyor comprising:
    slats arranged adjacent to one another to constitute an article conveying surface along a conveying path defined by frames;
    slat supporting members supporting respective slats and movable in a travelling direction in said conveying path, each of said slats having a first open connection portion located in a first end thereof and a second open connection portion located in a second end thereof opposite from said first end in said conveying path;
    at least one coupling shaft having a first shaft portion and a second shaft portion eccentric with respect to said first shaft portion; and
    means for preventing relative motion between said first shaft portion and said first connection portion comprising a disk member fixed on an axial end of said first shaft portion and having a diameter larger than that of an opening of said first connection portion, and a fixing member for fixing said disk member to said first connection portion to prevent relative rotation between said first shaft portion and said first connection portion,
    wherein said first and second connection portions of an adjacent pair of said slat supporting members are respectively engaged with said first and second shaft portions to couple said adjacent pair, and wherein said first shaft portion is located in one of a first position wherein said first shaft portion is displaced relative to said second shaft portion in said travelling direction and a second position wherein said first shaft portion is displaced relative to said second shaft portion in a direction opposite to said travelling direction to selectively vary a distance between said adjacent pair.

2. The slat conveyor according to claim 1, wherein said first and second shaft portions are rotatable with respect to said first and second connection portions, respectively, of said adjacent pair while remaining engaged therewith.

3. The slat conveyor according to claim 1, further comprising:
    means for preventing removal of said coupling shaft from said adjacent pair.

4. The slat conveyor according to claim 1, wherein said first and second connection portions are overlapped with each other when they are coupled through said coupling shaft.

5. The slat conveyor according to claim 1, wherein some of adjacent pairs of said slat supporting members are coupled through a cylindrical shaft, and the other pairs thereof are coupled through said coupling shafts.

* * * * *